April 9, 1940.  M. E. COLLINS  2,196,583
UNITARY OPTICAL ASSEMBLY
Original Filed July 30, 1937  2 Sheets-Sheet 1
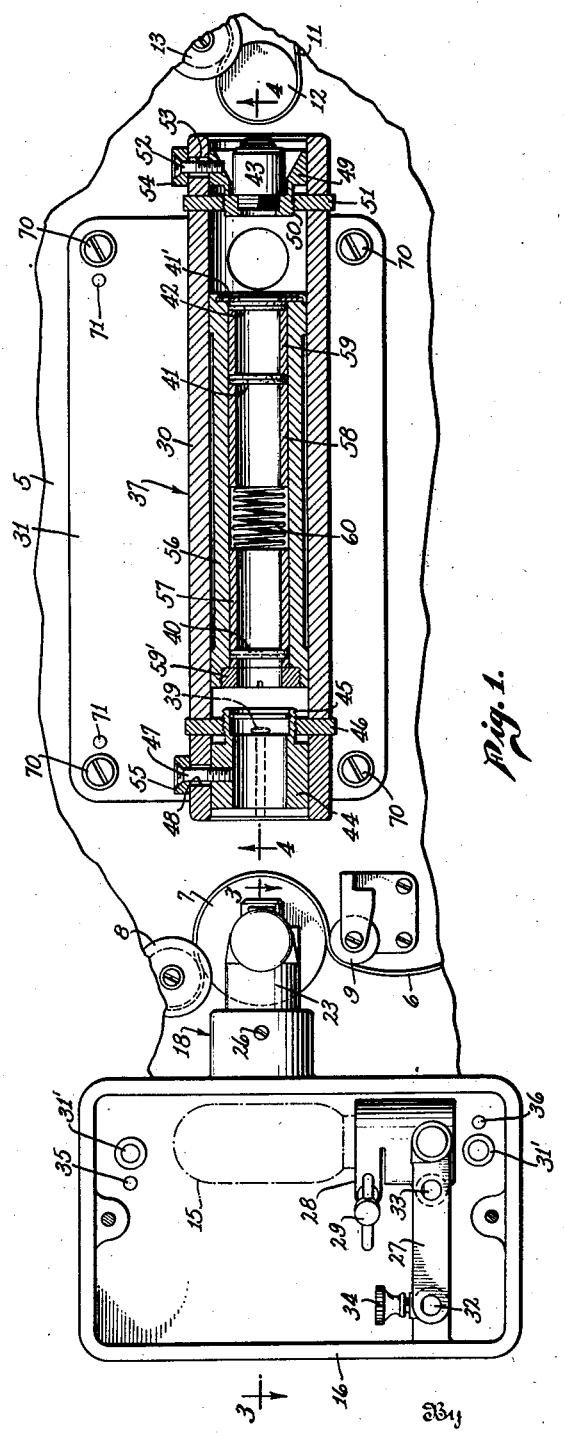
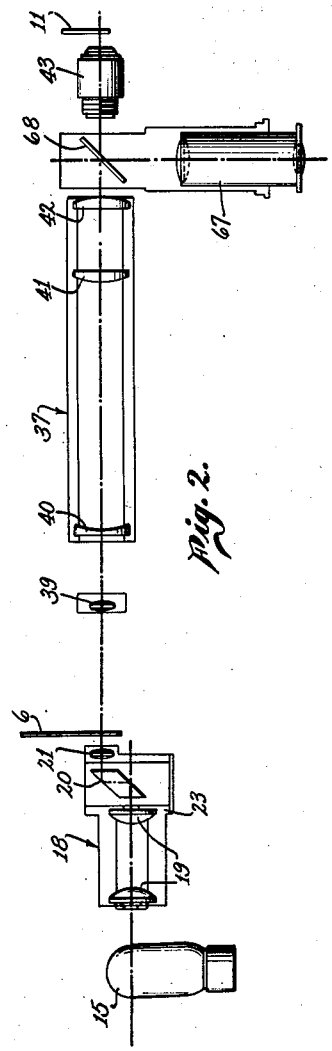
Inventor
Milford E. Collins
ATTORNEY

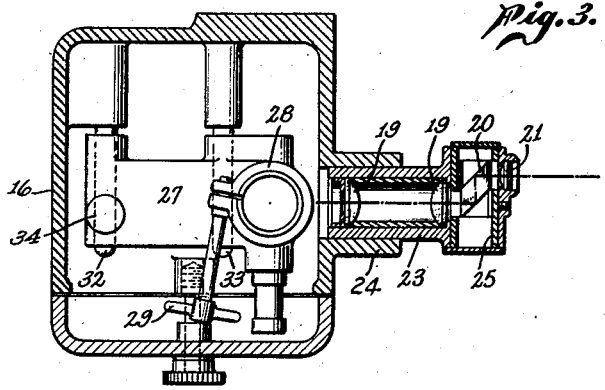
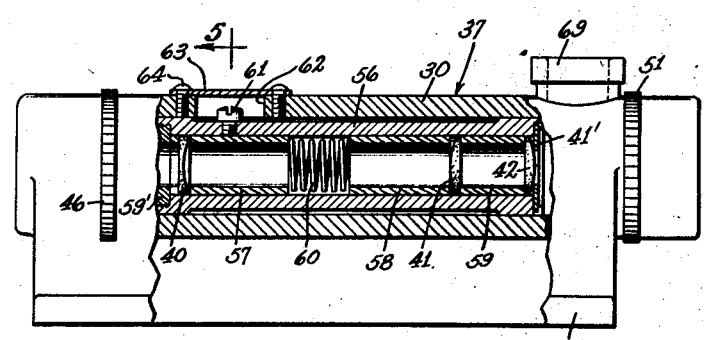
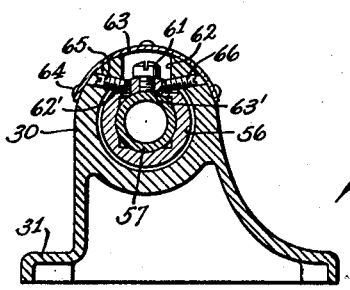
Inventor
Milford E. Collins
ATTORNEY

Patented Apr. 9, 1940

2,196,583

UNITED STATES PATENT OFFICE 2,196,583

UNITARY OPTICAL ASSEMBLY

Milford E. Collins, Hollywood, Calif., assignor to Radio Corporation of America, a corporation of Delaware Original application July 30, 1937, Serial No. 156,506. Divided and this application May 28, 1938, Serial No. 210,661

8 Claims. (Cl. 88—24)

This invention relates to motion picture printing apparatus and particularly to the optical portion of such printers wherein an image on a negative film is projected to a positive film, the image on the positive being either of the same dimensions or of different dimensions from that on the negative.

The printing of the sound track on a motion picture film, particularly when the dimensions thereof are changed during the printing process, requires accurate positioning of all the vital elements such as the light source, films, reflectors and lenses, while the printer itself requires a rugged construction for commercal purposes. In the manufacture of motion picture film printing apparatus, therefore, it is desirable that all possible fixed adjustments between cooperating elements be made at the factory or assembling plant where the necessary equipment and engineering skill are present. Particularly is this true of the optical portion of the printers involving the light source and lenses which project the light beam to the negative and then from the negative to the positive. In an anamorphosing system wherein a sound track is being printed to smaller dimensions or to dimensions different from those of the original sound track, adjustment of these lenses is particularly critical. Some of these adjustments are the orientation of the azimuths of the non-spherical lenses and the focusing for position and size of the light source upon the surface of the negative film, and of the modulated beam upon the surface of the positive film.

This application is a division of my copending application, Serial No. 156,506, filed July 30, 1937, disclosing the general arrangement of optical units, film drive and means for adjusting the lateral position of the film with respect to the light beam. The present invention is directed to the optical units themselves which are assemblies embodying novel constructions for adjusting the various lenses and other optical elements employed therein.

A particular feature of the invention described in the above-mentioned copending application is the unitary optical assembly intermediate the negative and positive films. This unit, after the individual elements thereof have been adjusted and sealed, is doweled to the supporting plate in a fixed relationship with respect to the films, the surfaces of which are fixed by rollers over which the films pass. The method of and means for adjusting the azimuth and focus of the various lenses and the construction of the optical assemblies is involved in the present invention. The adjustments may be made quickly and accurately within a rugged unitary assembly suitable for mounting on the printer mounting plate.

An object of the invention, therefore, is to facilitate the adjustment of the various lenses of an optical assembly during construction of a film printer.

Another object of the invention is to provide within a complex unitary optical assembly means for adjusting the individual elements thereof.

A further object of the invention is to unitize a plurality of optical elements whereby the unit may be bodily translated between an object and the image thereof.

Although the novel features which are believed to be characteristic of this invention will be pointed out with particularity in the claims appending herewith, the invention itself, its objects and advantages, the manner of its organization and the mode of its operation will be better understood by referring to the following description read in conjunction with the accompanying drawings forming a part thereof, in which:

Figure 1 is a sectional plan view of a printer in which the optical assembly embodying the features of the invention is shown in cross-section;

Figure 2 is a schematic plan view of the optical arrangement of Fig. 1;

Figure 3 is a cross-sectional view of the lamphouse and associate optical elements taken along the line 3—3 of Fig. 1;

Figure 4 is a partial cross-sectional view taken along the line 4—4 of Fig. 1; and Figure 5 is a cross-sectional view taken along the line 5—5 of Fig. 4.

Referring now to the drawings in which the same numerals identify like elements, and particularly to Fig. 1, a frame plate 5 serves as a mount common to the optical assemblies, rollers, sprockets and other printer film advancing elements. A negative film 6 is passed over a roller 7 guided by an edge-guide roller 8 and a wrapping roller 9. A positive film 11 is passed over a roller 12 edge-guided by a roller 13, the details of the negative and positive film paths being shown in detail in the above-mentioned copending application.

Light from a source such as a lamp 15 housed in a casing 16 is gathered by an optical assembly 18 including lenses 19, a rhomboid reflector 20, and an objective lens 21. (See Figs. 2 and 3.) These optical elements are mounted within a housing 23, the rhomboid reflector 21 being mounted in a cylindrical sleeve 25 adjustable within a hollow portion of the housing 23 to align the light beam with respect to lenses 19 and 21. The housing 23 as a unit is adjustable along the optical axis of lenses 19 within a boss 24 of the lamp casing 16, and when adjusted is maintained in fixed position by a set screw 26. The adjustment of the assembly 18 within the casing 16 adjusts the focusing of the light upon the negative film 6.

The lamp 15 is held in position in its support 27 by a clamping collar 28 about the lamp base under control of a finger screw 29. The support 27 is adjustable laterally upon pins 32 and 33 and locked in position thereon by a nut 34. After adjustments of the lamp and of the assembly 18 have been made, the entire housing 16 may be adjusted as a whole upon plate 5 and accurately positioned thereon by means of dowel pins 35 and 36, screws 31' being the fastening means.

Referring now to the optical assembly 37 which may vary the dimensions of the beam emerging from the negative 6 for projection upon the positive 11, an objective lens 39, a cylindrical lens 40, a reversing lens 41, a cylindrical lens 42, and an objective lens 43 are included within the barrel or tube portion 30 of a mounting fixture having a base 31 (see Fig. 5). The lenses 40, 41 and 42 are for the purpose of anamorphosing and reversing the image, reversal of the image being necessary since both the negative and positive films travel in the same direction with their emulsion sides toward one another.

The objective lens 39 is mounted in a holder 44 slidable longitudinally within the barrel 30 by action of a knurled ring 46 threaded on a portion 45 thereof. The ring 46 extends beyond the circumference of barrel 30 for manual adjustment of the objective lens 39 along its optical axis (see Fig. 4). The holder 44 for lens 39 is held in any adjusted position by means of a set screw 47 threaded therein, the screw 47 passing through a slot 48 of the tube 30. The head of the screw 47 is carried by a block 55 slidable on the tube 30. At the other end of the tube 30, the objective lens 43 is similarly adjustable by being mounted in a holder 49 having a threaded portion 50, the latter being threaded within a knurled ring 51. The holder 49 in which lens 43 is mounted is locked in adjusted position by means of a set screw 52 slidable in a block 54 in a slot 53 of the tube 30 in the same manner as the arrangement at the other end of the tube. When the lenses 39 and 43 have been adjusted the screws 47 and 52 may be sealed.

Referring now to the mounting of the three cylindrical lenses 40, 41 and 42, these lenses are spaced with respect to one another by means of cylinders 57, 58 and 59 within a broached cylinder or lens barrel 56. A compression spring 60 interposed between cylinders 57 and 58 maintains the lenses in a fixed longitudinal position, the spring reacting against a stop 41' and an exteriorly threaded nut 59' threaded in the other end of cylinder 56. This broached cylindrical unit, including lenses 40, 41 and 42, is adjustable longitudinally as a unit by means of a screw 61 threaded therein and slidable within a cut-out portion 62 of the barrel 30 (see Fig. 4). The screw 61 also functions as a set screw to aid in the assembly of the cylindrical lenses by holding the spacing cylinder 57 in place while lens 40 and nut 59' are being positioned. A plate 63 held in position by screws 64 covers the opening 62. Rotational adjustment of the cylinder 56 within tube 30, to vary the azimuth of the cylindrical lenses, is obtained by screws 65 and 66 (see Fig. 5). These screws also maintain the broached cylinder 56 in both longitudinal and rotational adjusted positions after adjustment. To prevent marring of the shoulder portions of the cylinder 56 by the ends of screws 65 and 66 abutting thereon, two hardened steel spacers 62' and 63' are employed therebetween.

The above optical mount permits quick and accurate adjustment of the five lenses with respect to one another during assembly of the unit, after which no further attention need be given to it unless damaged. For instance, after the lenses have been adjusted with respect to each other, the adjusting means may be sealed. During these adjustments the base 31 is held to the plate 5 by the screws 70, the holes thereof being oversize to provide for slight movement of base 31. When the position of the assembly has been determined, it is fixedly positioned on plate 5 by dowel pins 71, within cooperating holes in base 31 and plate 5. The unit is then removable as a whole for repair and adjustment and may be replaced upon the dowels in its exact former position.

In Fig. 2, an eyepiece 67 is shown positioned at right angles to the optical axis of the optical system and directed at a light transmitting reflector 68 positioned at an angle of 45° to the optical axis of the system. This optical unit is used in making adjustments at the factory and particularly for checking the focusing of the light beam upon the surface of positive film 11. A cap 69 is placed over the opening in the tube after removal of the eyepiece and reflector.

It is to be noted that since lenses 40, 41 and 42 are only for the purpose of varying dimensions and image reversal, their positions are fixed with respect to one another along their common optical axis by spacers 57, 58 and 59. However, they are adjustable as a unit within the tube 30, and when the unit is adjusted, it may be locked by set screw 61 which may be sealed. Plate 63 then covers the seal. Similarly, the adjustment of the objective lenses 39 and 43 by the knurled washers 46 and 51 may be locked in position by set screws 47 and 52, respectively, after which these screws may be sealed to prevent casual adjustment. The azimuth or rotational adjustment of the unit accomplished by screws 65 and 66 may be fixed by sealing screws 65 and 66 in their final, adjusted position. At the factory, where skilled engineers are familiar with the optical elements of assembly 37, these adjustments may be accurately and quickly made with respect to the film surfaces on rollers 7 and 12.

Thus, both optical assemblies comprising the unit for impressing the light upon the negative film and the unit for transferring the emergent light to the positive film are both unitary to the extent that each unit can be handled and operated as a single element, although composed of a plurality of cooperating, pre-adjusted elements. These particular optical units have contributed largely to the commercial success of sound film printing wherein sharp and clear images on the positive have been uniformly obtained under commercial conditions.

I claim as my invention:
1. A unitary optical assembly comprising a plurality of different types of optical elements, a cylindrical housing for said elements, lenses of a similar type at the ends of said cylindrical housing, means for adjusting said similar optical elements longitudinally of said cylindrical housing, said means comprising cylindrical threaded rings concentric with and extending beyond the circumference of said cylindrical housing, a cylindrical member within said first cylindrical housing intermediate said similar optical elements and adapted for longitudinal adjustment between and along the optical axis of said lenses of similar type and for rotational movement, a plurality of cooperating optical elements positioned within said cylindrical member said member maintaining the orientation of each of said optical elements fixed with respect to one another, a plurality of spacing members within said second cylindrical member for maintaining the focus of each of said optical elements fixed with respect to one another, and means for adjusting the azimuth and focus of said cooperating optical elements as a unit with respect to said lenses of similar type.

2. An optical assembly comprising a cylindrical housing adapted for mounting on film apparatus, a lens mounted within one end of said cylindrical member, a second lens mounted at the other end of said cylindrical member, respective supports for said lenses slidable within said housing and having threaded portions thereon, interiorly threaded cylindrical rings mounted on the threaded portions of said supports and extending outside of said cylindrical housing for longitudinally adjusting said lenses along their optical axes, means for locking said supports in any adjusted position, a cylinder interposed between said lenses within said cylindrical housing, a plurality of lenses within said cylinder, said cylinder being broached parallel to the common optical axis of said plurality of lenses to maintain the orientation of each of said plurality of lenses fixed with respect to one another a plurality of spacing members within said broached cylinder and coacting therewith for longitudinally spacing said plurality of lenses and maintaining the focus of each of said plurality of lenses fixed with respect to one another, means for rotating and longitudinally adjusting said cylinder within said cylindrical housing for relating said plurality of lenses as a unit with said first-mentioned lenses, and means for fixing said cylinder in any adjusted position.

3. An optical assembly in accordance with claim 2 in which means are provided for sealing all of said adjusting means.

4. An optical unit adapted for unitary adjustment between a fixed object and a surface upon which the image of said object is projected, comprising a mounting having a cylindrical housing portion, said mounting being adapted for attachment to film apparatus, a lens mounted adjacent each end of said cylindrical housing, respective holders for said lenses, said holders being adapted for longitudinal movement within said housing along the optical axes of said lenses and having respective threaded portions thereon, interiorly threaded rings mounted on respective threaded portions of said holders, said rings projecting through slots in said housing, rotation of said rings moving said lenses along their optical axes, means connected to said holders and extending externally of said housing for locking said holders in respective adjusted positions, a lens barrel within said housing and intermediate said holders, said lens barrel being broached longitudinally thereof and substantially parallel to its axis, a plurality of lenses in said barrel in substantially optical alignment with said last-mentioned lenses, a plurality of coaxial tubes within said barrel and coacting therewith for fixedly orienting and spacing said elements with respect to one another within said cylinder, and means accessible from the exterior of said housing for rotating said cylinder and lenses for positioning said cylinder with respect to said first-mentioned lenses.

5. An optical unit adapted for unitary adjustment between a fixed object and a surface upon which the image of said object is projected comprising a mounting having a cylindrical housing portion, said mounting being adapted for attachment to film apparatus, a lens barrel within said cylindrical housing, said barrel being broached longitudinally and substantially parallel to the axis thereof a plurality of cooperating lenses mounted within said lens barrel, a plurality of coaxial tubes carried by said lens barrel, said broached lens barrel and coaxial tubes coacting to maintain the orientation of each of said cooperating lenses fixed with respect to each other and for fixedly spacing said elements longitudinally along said lens barrel, means for rotating and longitudinally adjusting said lens barrel and said cooperating lenses as a unit within said housing, a lens at each end portion of said cylindrical housing, and means extending externally of said housing for longitudinally adjusting each of said lenses with respect to the cooperating lenses within said lens barrel.

6. A unitary optical assembly in accordance with claim 5 in which means are provided for locking said lens barrel and said lenses at the ends of said housing in any adjusted position, said means permitting sealing of said locking means.

7. A unitary optical unit comprising a housing, a lamp, means for adjustably supporting said lamp on and within said housing, a cylindrical boss integral with said housing, a cylindrical member within said boss and adapted for adjustment along the coincident axis of said member and said boss, a plurality of lenses within said cylindrical member and having an optical axis coincident with the axis of said member and said boss, said cylindrical member having a transverse cylindrical portion, and a second cylindrical member within said transverse cylindrical portion and having a reflecting optical element therein for shifting the axis of said light beam passing through said lenses, all of said above-mentioned elements being adjustable as a unit with respect to an image surface.

8. An optical assembly comprising a casing, a lens barrel in said casing and interiorly broached with grooves longitudinally thereof and substantially parallel to the axis of said lens barrel, a plurality of coaxial tubes within said lens barrel, a plurality of lenses intermediate said tubes, means supporting said lenses and coacting with said tubes and the grooves in said lens barrel for maintaining the orientation of each of said lenses fixed with respect to one another, a second plurality of lenses in said casing, and means for adjusting said first plurality of lenses as a unit both as to focus and orientation with respect to said second plurality of lenses.

MILFORD E. COLLINS.